Dec. 29, 1964   M. M. BOSTWICK   3,163,151
ANIMAL SHELTER
Filed Sept. 9, 1963
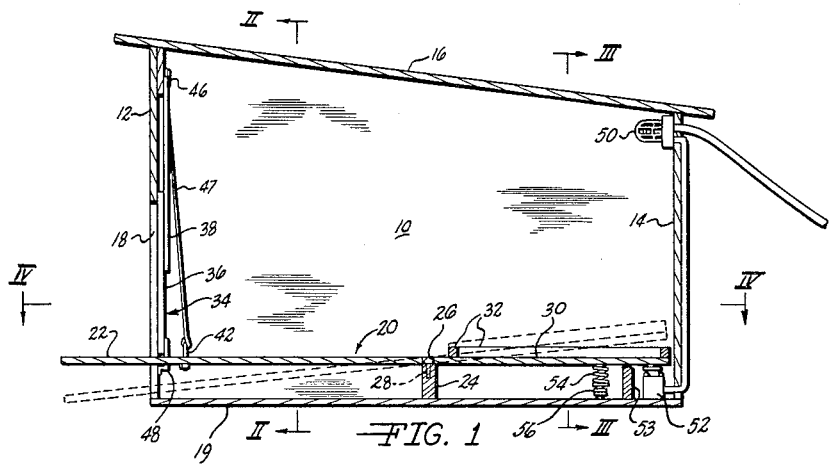
INVENTOR
MICHAEL M. BOSTWICK
BY Beaman Beaman
ATTORNEYS United States Patent Office 3,163,151
Patented Dec. 29, 1964

3,163,151
ANIMAL SHELTER
Michael M. Bostwick, 5309 Spring Arbor Road,
Jackson, Mich.
Filed Sept. 9, 1963, Ser. No. 307,673
4 Claims. (Cl. 119—19)

The invention pertains to an animal shelter, and particularly pertains to an animal shelter having appliances which may be operated by the animal to increase its comfort and safety.

Animal shelters such as dog and cat houses, hog houses, etc., are usually provided with an entrance and exit opening through which the animal passes. Such openings are normally left open to provide unhindered use by the animal. However, such unsealed openings permit entrance of cold air, rain, snow, etc., adversely affecting the efficiency of the shelter.

It is an object of the invention to provide an animal shelter house having an opening for animal ingress and egress wherein a door is associated with the opening to seal the opening against the weather, and wherein the animal may operate the door merely by the application of weight to floor portions of the shelter.

Another object of the invention is to provide an animal shelter incorporating a door, or other appliances, which operate from the weight of the animal applied at predetermined locations upon the floor of the shelter.

An additional object of the invention is to provide an animal shelter employing a pivotally mounted floor, pivotable under the weight of the animal, wherein pivoting of the floor selectively operates appliances associated with the shelter.

Another object of the invention is to provide an animal shelter having an animal weight-operated, pivotable floor wherein pivoting of the floor operates appliances associated with the shelter. However, the operation of selected appliances is limited to a predetermined weight being applied to predetermined locations of the floor.

Yet another object of the invention is to provide an animal shelter of economical construction capable of producing excellent shelter under adverse weather conditions, wherein the operating components of the shelter are substantially free of possibilities of malfunctioning, and the animal-operated shelter components are such as to be operable by animals with a minimum of instruction.

These and other objects of the invention arising from the details and relationships of the components of an embodiment thereof will be apparent from the following description and accompanying drawings wherein:

FIG. 1 is an elevational, sectional view of a shelter house in accord with the invention as taken along section I—I of FIG. 2, FIG. 2 is an elevational, sectional view of the shelter house inside front wall, as taken along section II—II of FIG. 1, FIG. 3 is an elevational, sectional view of the inside back wall of the shelter house, as taken along section III—III of FIG. 1, and FIG. 4 is a plan, sectional view of the shelter house as taken along section IV—IV of FIG. 1.

The shelter in accord with the invention includes a house defined by side walls 10, a front end wall 12, a rear end wall 14, and a roof 16. The house walls may be constructed of Masonite, sheathing, plywood, or other conventional building material which provides an attractive appearance and is capable of withstanding exposure to the elements. An entrance and exit opening 18 is defined centrally within the front wall 12.

The shelter also includes a subfloor 19 and a floor 20, having a plan configuration which will be apparent from FIG. 4. In the disclosed embodiment, the floor 20 is of a planar, rigid construction substantially conforming to the inner configuration of the shelter house. A tongue portion 22 is defined on the floor of a width slightly less than that of the opening 18, whereby the tongue 22 may extend exteriorly of the housing through the opening 18, as will be apparent from FIGS. 1 and 4. A cross member 24 extends transversely across the lower regions of the housing between the side walls 10 and functions as a fulcrum to pivotally support the floor 20, whereby the floor is capable of pivoting about the axis 26. Pins 28 mounted in member 24 and received within recesses in floor 20 position the floor upon cross member 24. When the housing is to be used with animals requiring a bed, such as dogs and cats, a bed section 30 may be defined on the floor adjacent the rear wall 14 by means of upwardly extending elements 32 affixed to the floor.

The opening 18 is adapted to be sealed and unsealed by means of a door 34 consisting of a pair of rectangular panels 36, each of which is pivotally supported to the upper, inner region of the front wall 12 by a pair of parallel linkages 38. The linkages 38 are provided with pivot pins 40 at each end, whereby the panels 36 will each constitute a portion of a parallelogram linkage. The upper pivot pins 40 are so located that the panels 36 will assume the "closed door" relationship shown in full lines in FIG. 2 under the influence of gravity.

The door actuating structure includes cable anchors 42 affixed to the floor 20 at a location adjacent the inside of the front housing wall 12. Cable anchors 44 are also affixed to each of the panels. Sheaves 46 are rotatably attached to the upper region of the inside of the wall 12 and a cable 47 may be attached to each anchor 42 and threaded through a sheave 46 to the nearest panel anchor 44 in a manner which will be apparent from FIG. 2. It is desirable to provide door guide means which consist of brackets 48 affixed to the inside of the front wall 12, having upper portions adapted to engage the inner surface of the panels 36 whether they are in the closed or open positions.

The above described structure permits an animal to operate the door 34 by placing its weight upon a floor portion adjacent the front housing wall 12. Thus, the animal may either place its weight on the tongue portion 22, if it is outside the housing, or approach the door 34 to place its weight primarily between pivot axis 26 and front wall 12, if within the shelter house, to cause the floor 20 to pivot in a counterclockwise direction to the dotted line position, FIG. 1, and pull the panels 36 to the open position shown in dotted lines in FIG. 2. The animal may then pass through the opening 18 into the interior of the shelter house. If the animal is within the housing and desires to exit through the opening 18, it need merely approach the panels 36 and the floor will pivot counterclockwise to again open the door.

In that the operation of the door 34 is solely through the weight of the animal, it has been found that animals readily discover how to open the door on their own initiative. The cross member 24 is so located that the gravitational pull on the panels 36 and the floor bed section 30 closes the panels when no extraneous weight is being applied to the floor.

It is often desirable to locate lights, heaters, and other devices within the shelter for the animal's comfort and, in the illustrated embodiment, a combination light and heater device 50 is shown as affixed to the upper portion of the rear wall 14. Actuation of the electric device 50 is controlled by a switch 52 operatively associated with the floor 20. The switch 52 may be mounted adjacent the bed section of the floor 20, whereby upon the presence of an animal in the bed section 30, the floor will pivot clockwise sufficiently to close the switch 52 and, thus, energize the electrical light and heater device 50. Abutment 53 limits clockwise floor pivoting after switch 52 has been closed.

To prevent energization of the device 50 when the animal is not within the housing, a compression spring 54 is preferably located below the floor bed section 30 resisting movement of the floor in a direction which will actuate the switch 52. Adjusting means 56 are provided to adjust the biasing force imposed upon the floor by the compression spring 54. The biasing force produced by the compression spring 54 is predetermined to maintain the switch open when the floor is in its normal position. While the door panels 36 will be closed during the normal position of the floor, the floor will not be pivoted to its full clockwise position, FIG. 1. Upon the animal entering the housing and placing its weight on the bed section 30, the biasing force of the spring 54 will be overcome to permit the floor 20 to pivot from its normal position clockwise sufficiently to close the switch 52 and energize the device 50. Thus, the animal's comfort may be maintained while the animal is within the shelter, yet the electrical device 50 will be de-energized when the animal is not within the bed section. While the switch 52 and the spring 54 are illustrated as separate components, usually an electrical switch will be employed having a spring-biased actuating plunger and, thus, these components may be incorporated in a single device. It will be appreciated that the moveemnt of the floor 20 from the normally closed position to the switch-actuating position is very small. Thus, objectionable floor movement which would alarm the animal is not produced.

If desired, the switch 52 may be associated with a light mounted on the outside of the house to indicate the presence of the animal therein, or any type of electrical device desired may be associated with the switch. Also, appliances other than the door 34 and device 50 may be operated by the floor movement. For instance, ventilating windows may be actuated to open and close in accordance with the floor movement.

It is appreciated that many types of door structure, other than that illustrated, may be employed with the opening 18 which can be operated by the animal's weight on the floor 20, and variations to the disclosed embodiment may be apparent to those skilled in the art without departing from the spirit and scope of the invention, and it is intended that the invention be defined only by the following claims:

I claim:
1. An animal shelter comprising, in combination,
 (a) a shelter house having a floor area,
 (b) an entrance and exit opening defined in said shelter house,
 (c) a door movably mounted on said house adapted to selectively seal and unseal said opening,
 (d) a floor defined within said shelter house extending over the floor area, said floor including a portion extending exteriorly of said house through said opening a sufficient distance to permit exterior access to said floor to permit operation thereof,
 (e) means pivotally supporting said floor at a location remote from said door for pivotal movement between first and second positions under the influence of the weight of an animal imposed on the floor at predetermined locations, and
 (f) door actuating means interconnecting said door and floor whereby the weight of said door biases said floor upwardly toward said first position to normally close said door and weight imposed upon said floor adjacent said door tends to open said door.

2. In a shelter house as in claim 1,
 (a) electric appliance means within said shelter house,
 (b) a circuit holding electric switch operatively connected to said floor controlling energization of said appliance means in accordance with the position of said floor, and
 (c) biasing means imposing a biasing force on said floor resisting movement of said floor in a switch-energizing direction, wherein said floor is moved to a switch-energizing position only upon a predetermined weight being applied to said floor at a predetermined location.

3. An animal shelter comprising, in combination,
 (a) a shelter house,
 (b) an entrance and exit opening defined in said shelter house,
 (c) a door consisting of a pair of panels disposed adjacent said opening, a pair of equal length links supporting each of said panels, each of said links having first and second ends, first pivot means connecting said first link ends to a panel and second pivot means connecting said second link ends to said house, said second pivot means being vertically disposed above said first pivot means whereby said panels are suspended upon said links, the pivot means of the links supporting a common panel being arranged in a parallelogram relationship,
 (d) a floor defined within said shelter house,
 (e) means pivotally supporting said floor for pivotal movement between first and second positions under the influence of the weight of an animal imposed on the floor at predetermined locations, and
 (f) mechanical linkage means interconnecting said door panels and floor, whereby upon the floor portion adjacent said door being moved downwardly under the influence of an animal's weight said door panels are moved relative to said opening.

4. In an animal shelter as in claim 3 wherein:
 (a) said mechanical linkage means comprises a pair of pulleys mounted on said housing and a flexible tension member associated with each of said pulleys, said tension members having ends, one of said ends being attached to a panel and the other end being attached to said floor.

References Cited by the Examiner
UNITED STATES PATENTS

| 860,880 | 7/07 | Olmsted | 119—50 |
| 876,916 | 1/08 | Secrest | 119—50 |
| 1,336,802 | 4/20 | Willeford | 119—50 |
| 1,359,052 | 11/20 | Goldsmith | 119—50 X |
| 1,709,136 | 4/29 | Lockwood | 119—22 |
| 2,009,758 | 7/35 | Blatchford | 119—19 |
| 2,153,673 | 4/39 | Nidever | 119—22 |
| 2,617,005 | 11/52 | Jorgensen. | |

FOREIGN PATENTS 240,343 10/25 Great Britain.

SAMUEL KOREN, Primary Examiner.

HUGH H. CHAMBLEE, Examiner.